Patented June 13, 1933

1,913,775

UNITED STATES PATENT OFFICE

JAN STRAUB, OF BLOEMENDAAL, NETHERLANDS

PREPARATION OF ORGANIC PEROXIDES

No Drawing. Application filed March 21, 1929, Serial No. 349,005, and in the Netherlands April 5, 1928.

This invention relates to the preparation of organic peroxides particularly for use in the bleaching of materials. Hydrogen peroxide and inorganic peroxides and highly oxidized salts are commonly used for bleaching, but organic peroxides are employed for the same purpose. For example, di-benzoyl peroxide is employed, and many other symmetrical peroxides have been suggested for this purpose, as well as the asymmetrical acetyl-benzoyl peroxide. The melting points of most of these peroxides are above 100° C., but some melt between 50 and 60° C., while hydro-cinnamyl peroxide, acetyl-benzoyl peroxide, and di-acetyl peroxide, whose melting points are about 40° C., have properties, when pure, which render them unsuitable for technical use.

As a matter of fact, a commercial result of importance would be obtained if a method could be found for preparing peroxides which are liquid at lower temperatures than those already known, and in fact which form stable or super-cooled melts at temperatures below 40° C. As a matter of fact, the discovery of such methods opens up the possibility of using the peroxides in the liquid state, but the greater solubility in organic solvents that the peroxides having the lower melting points usually show, and the fact that the melted peroxides dissolve more rapidly, are of considerable technical importance.

The present invention makes use of the discovery that most organic peroxides do not form solid solutions or mixed crystals one in another, but have a tendency when mixed to cause lowering of the melting points of the peroxides. The amount the melting point is lowered is particularly great in ternary mixtures and more complicated mixtures. Such mixtures also yield, in many cases, supercooled melts which are stable for relatively long periods.

In the case of some of the peroxides, it is possible to prepare mixtures by vigorous stirring of the different component peroxides, each of which is obtained from the corresponding pure acid chloride in the usual manner by means of an inorganic peroxide, such as hydrogen peroxide, sodium peroxide, barium peroxide, and so forth, and a basic reagent such as caustic soda, the alkalinity of the mixture being tempered, if necessary, by adding sodium acetate, for example; see "Recueil de Travaux Chimiques des Pays-Bas" volume 43 (1924), page 364. However, it is usually necessary to melt together the component peroxides, at least in all cases where it is necessary to prepare supercooled liquids. Such a method is not practical from the industrial point of view as it is far too expensive and is liable to be dangerous owing to the necessity of melting the peroxides by heating them. It is true that this danger may be avoided by adding a volatile solvent to the peroxides, which solvent afterwards evaporates off, but this procedure still further increases the cost of making the mixture.

Now according to the invention, a mixture of organic peroxides is prepared directly from a mixture of the appropriate acid chlorides so that two or more peroxides are actually formed in the mixed condition. The reaction employed may be that which is commonly used in making a pure organic peroxide, namely by acting upon the mixture of acid chlorides by means of hydrogen peroxide, sodium peroxide, barium peroxide, and so forth, in the presence of caustic soda or other basic reagent such as pyridine. As a matter of fact, the acid chlorides themselves may be made by starting from mixed substances, such as mixtures of the acids, phenols or hydrocarbons, as such mixtures are produced, for example, in the distillation of tar. On the other hand, the acid chlorides may be prepared by a method that results in the formation of a mixture of isomeric chlorides from a pure reagent; see Holleman "Organic Chemistry" 1927 Dutch edition, pages 434 to 437.

Thus, the invention provides a simple method of preparing mixtures of organic peroxides which has the further advantage that in addition to the formation of symmetrical peroxides, asymmetrical peroxides are formed, which, because they do not exhibit any appreciable tendency to mix in the solid state with the symmetrical peroxides, have the effect of considerably lowering the melting points.

They have a particularly desirable effect in the mixture because several members of this new class of asymmetrical aromatic peroxides possess low melting points, are easy to super-cool, and are very stable in the metastable state, as is also the case, of course, in their mixtures with symmetrical peroxides, for example.

If a mixture of two acid chlorides is employed, the reaction results in the formation of two symmetrical and one asymmetrical organic peroxide, as can be shown by separating them by fractional crystallization from a melt or a solution. Thus in the case of a mixture of the four isomeric first homologues of benzoyl chloride, viz., ortho-, meta-, para-toluyl chloride and phenyl-acetyl chloride, theoretically ten different organic peroxides should be formed in admixture, and the eutectic point lies far below normal room temperature.

In comparison with the corresponding pure peroxides prepared by acting upon pure acid chlorides, such mixtures have a very low melting point, very little tendency to crystallization, and such a stability in the super-cooled state that in some cases the mixtures are even formed in the liquid condition from the reaction. The stability in the super-cooled state is improved by the presence of impurities resulting from the reaction or by the presence of related organic substances or decomposition products, or even of resinous products especially added.

The relative amounts of the different symmetrical and asymmetrical organic peroxides formed at the same time may be controlled by altering the proportions in which the acid chlorides are mixed before the reaction, or by suitable choice of temperature, reagent and concentration in the reaction. Thus the formation of a particular organic peroxide in considerable excess owing to one particular acid chloride reacting more rapidly, can be prevented by using the said acid chloride in dilute concentration, by working at a lower temperature, or by dilution of the reaction mixture with an indifferent liquid medium such as benzol, all of which factors affect the speed of formation of the different organic peroxides. Another means of retarding the formation of the peroxide corresponding to a particular acid chloride is to pour in that acid chloride slowly while the reaction is taking place, and thus maintaining this chloride constantly present in small concentration.

The reaction may be carried out in such a way that the mixture desired is the product directly resulting from the reaction, but the conditions of the reaction may be selected otherwise, and the mixture formed may be separated into liquid and solid fractions at a definite temperature, for example, by freezing out or mechanically pressing out the liquid from the solid, or by like known physical procedure. In this case, the solid fractions are either relatively simpler mixtures of organic peroxides than the liquid fractions, or may be even pure peroxides.

In general, in preparing mixtures of organic peroxides from mixtures of acid chlorides, all variations in operation may be taken advantage of which are known for the preparation of pure organic peroxides from pure acid chlorides, and may be employed to affect the relative proportions in which the different peroxides are formed.

*Example 1*

A mixture of 15 grams of benzoyl chloride and 15 grams of ortho-toluic chloride are treated with an inorganic peroxide, for example, hydrogen peroxide, in the presence of a basic reagent, such as caustic soda, and the alkalinity of the mixture may be tempered by the addition of sodium acetate, for example, the reaction mixture being continually cooled. The sticky mass of mixed peroxides formed is taken up in ether, the solution washed, dried, filtered, and the ether evaporated off. The residue contains 6.11% of active oxygen by titration, so that the reaction product directly obtained is 97 per cent pure. The active oxygen by calculation is 6.61% in the case of di-benzoyl peroxide, 5.93% in the case of di-ortho-toluyl peroxide, and 6.27% in the case of benzoyl-ortho-toluyl peroxide.

The melting point of the mixture is found to be about 80° C., and the mixture contains a great excess of di-benzoyl peroxide which can be removed. The eutectic point of the ternary mixture is 27° C.

For the purposes of comparison, it may be mentioned that the melting point of di-benzoyl peroxide is 103.5° C., that of di-ortho-toluyl peroxide is 54° C., and the eutectic point of the binary mixture of the two symmetrical peroxides is 50° C.

*Example 2*

A mixture of 2.2 grams of para-toluic chloride and 11 grams of meta-toluic chloride is treated in exactly the same way as the mixture in Example 1. The product of reaction directly obtained is a weak crystalline mass melting at from 25 to 28° C. It is dissolved in petroleum ether, washed, dried, filtered, and the solvent evaporated off. The product is found to be 90% pure according to titration and melts at 28.5° C. After purifying to 100% pure by recrystallization, the melting point is between 32 and 33° C. For the purposes of comparison it may be mentioned that the melting point of di-para-toluyl peroxide is 133° C., that of di-metatoluyl peroxide is 56° C., and the eutectic point of the binary mixtures of these two peroxides is 53° C. The presence of the asymmetrical peroxide thus lowers the melting point by 20° C. below the binary eutectic point.

The liquid mixture obtained is easily super-cooled to 0° C., but after a long period of time it solidifies to a thin paste owing to the formation of a small amount of fine crystals of di-para-toluyl peroxide. The ternary mixture contains more of this peroxide than the ternary eutectic.

By mixing with a small amount of the product obtained in Example 3 or Example 4 below, or of a fraction obtained from these by fractional crystallization, the composition can be altered towards that of the ternary eutectic, and thus the melting point may be lowered still further.

Example 3

A mixture of 2 grams of meta-toluic chloride and 12 grams of para-toluic chloride is treated as in Example 2, and gives a product of reaction which is easily super-cooled to 0° C. By initiating crystallization of the symmetrical peroxides, pure di-meta-toluic peroxide and pure di-para-toluic peroxide are obtained, and meta-para-toluyl peroxide remains in the liquid state in a less pure condition.

Example 4

A mixture of 2 grams of meta-toluic chloride and 10 grams of para-toluic chloride is treated as in Example 3, and during the reaction a further 10 grams of para-toluic chloride is gradually added. The product of reaction contains the three component organic peroxides in different proportions from those in the product according to Example 3, as may be shown by a fractional crystallization.

Example 5

A mixture of 5 grams of ortho-toluic chloride and 5 grams of meta-toluic chloride is mixed with the reagents necessary for the formation of peroxides. The mixture is still liquid after five hours, and is taken up in petroleum ether, the solution purified and evaporated. The residue is an oily liquid 98% pure as shown by titration, as compared with the calculated figures for toluyl peroxide. The oil remains quite liquid even below 0° C. It does not crystallize when contaminated by mixing with it solid di-ortho-toluyl peroxide and di-meta-toluyl peroxide, and consists largely of asymmetrical meta-ortho-toluyl peroxide, which owing to its low melting point and ease of super-cooling could not be obtained in the solid state. The binary eutectic point of the symmetrical peroxides is at 33° C.

Example 6

A mixture of 5 grams of benzoic chloride and 5 grams of ortho-toluic chloride is worked up to form a mixture of peroxides, for example as described in Example 1. A product of reaction is formed after three hours having the consistency of butter at normal room temperature. The mixture, after purification, is warmed to 35° C. and then forms a thin paste of crystals, and by suction is separated into a mixture of peroxides liquid at 35° C. and solid di-benzoyl peroxide with some mother liquor adhering.

The filtrate crystallizes slowly and can be separated by suction at 29° C. into solid and liquid portions. The solid portion is a mixture of two peroxides; the liquid portion is the ternary mixture of the three respective peroxides approximately in eutectic proportions.

All the melting points given above should be regarded as approximate only, because small amounts of impurities have a great effect on them, and even in the case of the pure peroxides, the melting point is somewhat dependent upon factors not yet fully determined. Beilstein volume IX, page 179 gives the melting point for the best known organic peroxide, i. e. di-benzoyl peroxide, as 103.5° C., 106 to 108° C., and 110° C.

What I claim is:—

1. A method of preparing organic peroxides, comprising converting into peroxides a mixture of benzoyl chloride and one of the toluyl chloride.

2. A method of preparing organic peroxides, comprising converting into peroxides a mixture of two different toluyl chlorides.

3. A method of preparing organic peroxides, comprising converting into peroxides a mixture of the three toluyl chlorides.

4. A method of preparing organic peroxides, comprising converting into peroxides a mixture of benzoyl chloride and two different toluyl chlorides.

5. A method of preparing organic peroxides, comprising converting into peroxides a mixture of benzoyl chloride and the three toluyl chlorides.

JAN STRAUB.